(12) United States Patent
Turoff et al.

(10) Patent No.: US 12,292,416 B2
(45) Date of Patent: May 6, 2025

(54) THERMAL AND COMPRESSION TEST FIXTURE

(71) Applicants: Riley D. Turoff, King George, VA (US); Dylan J. Ciraco, Fredericksburg, VA (US)

(72) Inventors: Riley D. Turoff, King George, VA (US); Dylan J. Ciraco, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 439 days.

(21) Appl. No.: 17/980,805

(22) Filed: Nov. 4, 2022

(65) Prior Publication Data
US 2024/0151617 A1 May 9, 2024

(51) Int. Cl.
*G01N 3/18* (2006.01)
*G01M 9/06* (2006.01)

(52) U.S. Cl.
CPC ............... *G01N 3/18* (2013.01); *G01M 9/06* (2013.01); *G01N 2203/0019* (2013.01); *G01N 2203/0037* (2013.01); *G01N 2203/0057* (2013.01); *G01N 2203/0252* (2013.01); *G01N 2203/0476* (2013.01)

(58) Field of Classification Search
CPC ............ G01N 3/18; G01N 2203/0019; G01N 2203/0057; G01N 2203/0252; G01N 2203/0694
See application file for complete search history.

(56) References Cited

U.S. PATENT DOCUMENTS

| 6,142,662 A | * | 11/2000 | Narh | G01N 25/18 374/30 |
| 2020/0064287 A1 | * | 2/2020 | Mori | G01N 25/18 |

FOREIGN PATENT DOCUMENTS

| CN | 101929970 B | * | 5/2012 | |
| CN | 108445040 A | * | 8/2018 | G01N 25/20 |

* cited by examiner

*Primary Examiner* — Mirellys Jagan
(74) *Attorney, Agent, or Firm* — Gerhard W. Thielman (57) ABSTRACT

A test fixture is provided for containing a pair of test samples (i.e., sample pair) that contact each other along an interface. The fixture receives exposure to laser emission for radiative heating while providing compression to the sample pair. The text fixture includes a housing, an isolation container, and a compressor. The housing has an axial cavity with annular cross-sections including an internal helical thread portion and a window for receiving the laser emission. The isolation container receives the sample pair. The container inserts into the axial cavity and including an opening for disposition adjacent to the window. The compressor has circular cross-sections for insertion into the axial cavity and includes an external helical thread portion for engaging the internal helical thread portion of the housing. Axial pressure applies to the isolation container by turning the compressor inside the axial cavity. The isolation container provides thermal insulation from the housing and the compressor. In additional embodiments, the isolation container comprises a cup with the opening to isolate the sample pair from the housing, and a washer to isolate the sample pair from the compressor.

5 Claims, 9 Drawing Sheets

THERMAL AND COMPRESSION TEST FIXTURE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to test fixtures. In particular, the invention relates to a test fixture for disposing instrumented samples for high compression and high heat flux loads.

Thermal contact resistance (TCR) is a driving parameter in the thermal analysis of hypersonic vehicles. Thermal analyses are used to predict if these hypersonic vehicles will survive the extreme aerothermodynamic environment ay hypersonic speeds. Therefore, accurate values of TCR are necessary to accurately predict the thermal survivability of a hypersonic vehicle.

Conventional TCR test fixtures are typically simple designs. The fixtures consisted of two samples of materials pressed into contact by a hydraulic press. Thermocouples are disposed along each material and sufficiently close to the contact of a sample pair to measure temperature gradient. A resistance heater applies a heat flux inside of the first sample, and the heat flows to the second sample.

These designs are adequate for low temperature applications but are inadequate for applying high temperature loads to materials. Emulation of hypersonic heating environments necessitate high temperature loads. Such aerothermodynamic heating reaches material temperatures a factor of five-to-ten times greater than those delivered by resistance heaters in conventional TCR test fixtures. Conventional techniques cannot emulate the hypersonic thermal environment, and therefore, cannot produce temperature gradient data of materials in contact experiencing such conditions.

SUMMARY

Conventional test fixtures yield disadvantages addressed by various exemplary embodiments of the present invention. In particular, various exemplary embodiments provide a test fixture for containing a pair of test samples (i.e., sample pair) that contact each other along an interface. The fixture receives exposure to laser emission for radiative heating while providing compression to the sample pair. The text fixture includes a housing, an isolation container, and a compressor.

The housing has an axial cavity with annular cross-sections including an internal helical thread portion and a window for receiving the laser emission. The isolation container receives the sample pair. The container inserts into the axial cavity and including an opening for disposition adjacent to the window. The compressor has circular cross-sections for insertion into the axial cavity and includes an external helical thread portion for engaging the internal helical thread portion of the housing.

Axial pressure applies to the isolation container by turning the compressor inside the axial cavity. The isolation container provides thermal insulation from the housing and the compressor. Other various embodiments alternatively or additionally provide for the isolation container to include a cup with the opening to isolate the sample pair from the housing, and a washer to isolate the sample pair from the compressor.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches (in), mass in grams (g), time in seconds (s), angles in degrees)(°), force in newtons (N), temperature in kelvins (K), and pressure in pascals (Pa). Supplemental measures can be derived from these, such as density in grams-per-cubic-centimeters ($g/cm^3$), moment of inertia in gram-square-centimeters (kg-m 2) and the like.

The exemplary test fixture can be used to calculate thermal contact resistance (TCR) values by emulating the hypersonic aerothermodynamic environment. The values can be compared to predicted values from mathematical models.

Figure 1:
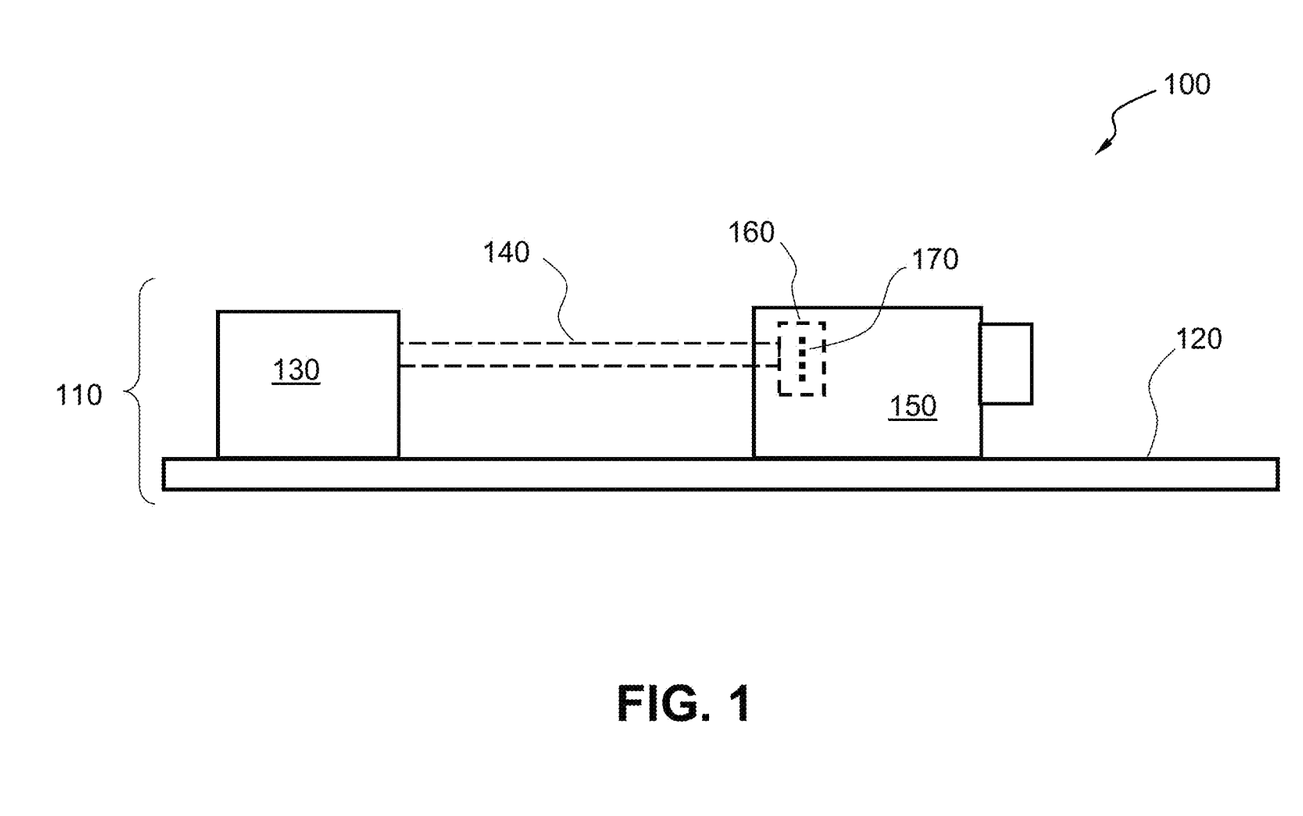
FIG. 1 is an elevation schematic view of a laser-heating bench for sample compression testing.

FIG. 1 shows an elevation view 100 of a laser-heating bench 110 for sample compression testing. A table 120 provides a platform on which test components can be mounted. A laser 130 that emits a coherent light beam 140 to an exemplary test fixture 150 with a container 160 for holding a test sample—for example two coupons joined at an interface 170. The fixture 150 compresses the coupons while the laser 120 imparts radiative thermal energy to them for response evaluation of the sample at high stress and heat conditions for support of hypersonic vehicle development.

Figure 2:
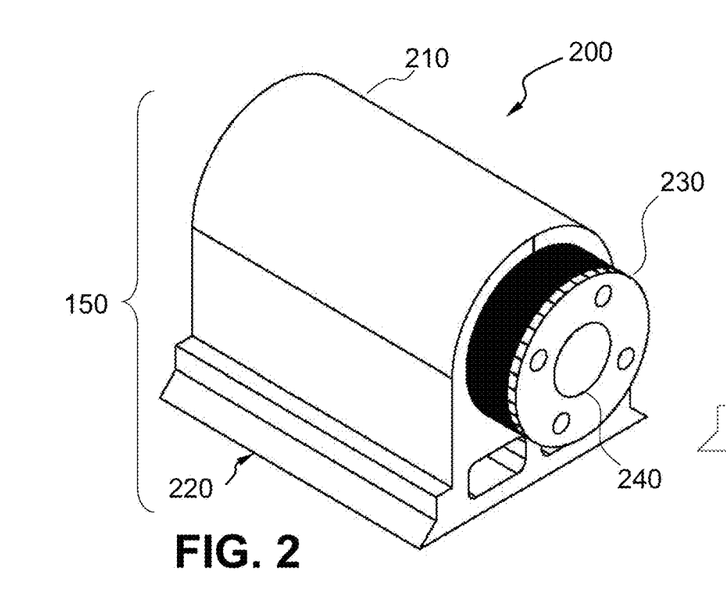
FIG. 2 is an isometric assembly view of an exemplary compression test fixture.

FIG. 2 shows an isometric assembly view 200 of the exemplary test fixture 150 that includes a fixture shell or housing 210 having chamfer edge base 220 for securing to the table 120. The housing 210 has a length of 8.0 inches, a width of 5.0 inches absent the base and a height of 6.5 inches. The base 220 has a width of 7.0 inches and clamps to the table 120. A push pipe or cylindrical compressor 230 with an axial length of 6.5 inches and an outer diameter of 4.12 inches extends into and from the housing 220. The compressor 230 includes an axial cavity 240 with a diameter of 1.75 inches to enable instrumentation wires to pass therethrough. Dimensions and materials provided are exemplary only and not limiting regarding the utility of the invention.

Figures 3A, 3B:
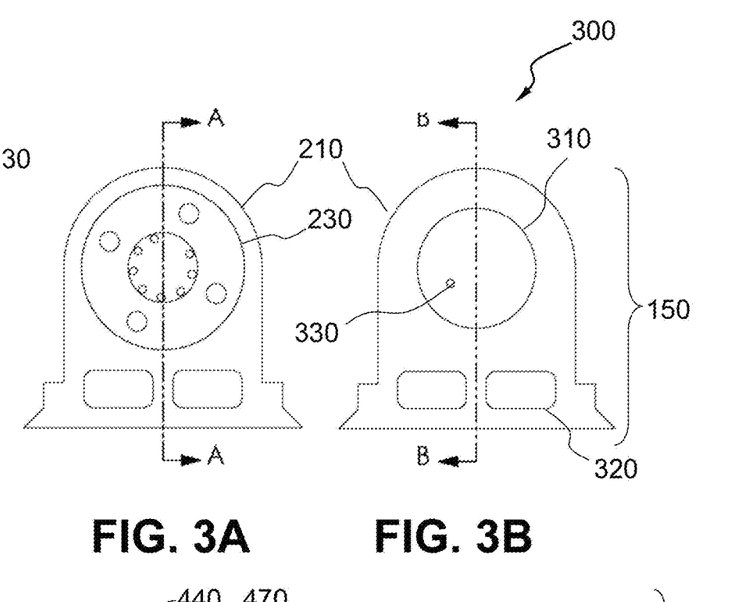
FIGS. 3A and 3B are elevation front and rear assembly views of the text fixture.

FIGS. 3A and 3B show elevation rear and front views 300 of the exemplary test fixture 150 with respective sectional cross-sectional directions A-A and B-B. The front view shows a circular window 310 with a diameter of 3.0 inches sized to receive the beam 140. The base 220 includes rounded cavities 320 that extend along the longitudinal extent of the housing 210 to reduce weight. A circular cavity 330 is visible within the window 310. The housing 210 and compressor 230 are composed of AISI 4340 steel. Example dimensions correspond to the bench 110 as described in view 100, but can be rescaled for alternative test configurations.

Figure 4A:
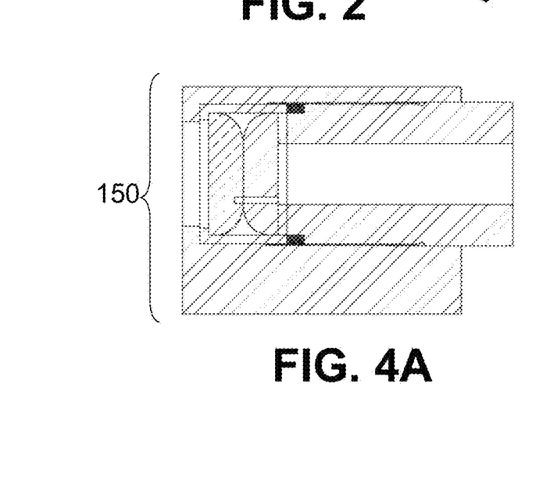
FIGS. 4A and 4B are elevation cross-section side views of the text fixture as assembly and explode components.
Figure 4B:
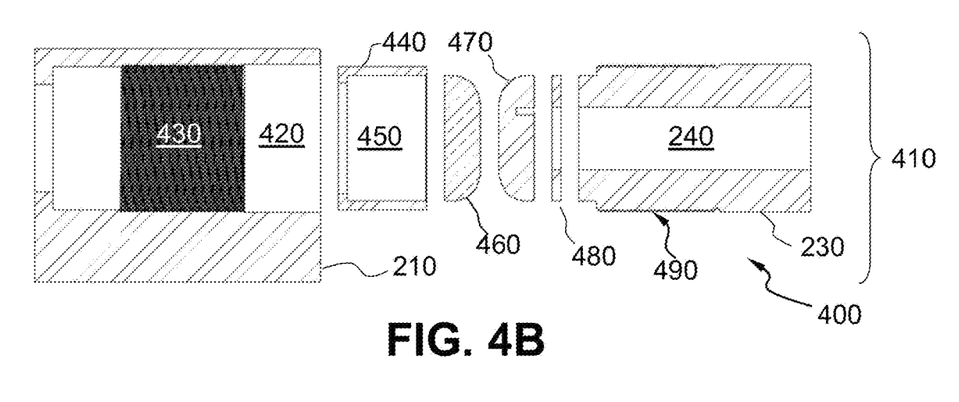

FIGS. 4A and 4B show cross-section views 400 of the respective assembly from section A-A and separated components 410 in section B-B of the test fixture 150. The housing 210 includes an annular opening 420 to receive components with an inner helical threaded portion 430. A tubular cup 440 containing a sample volume 450 can be inserted into the opening 420. Fore and aft coupons 460 and 470 can be inserted into this cylindrical volume 450. A shim washer 480 thermally isolates the aft coupon 470 from the compressor 230.

Figure 5:
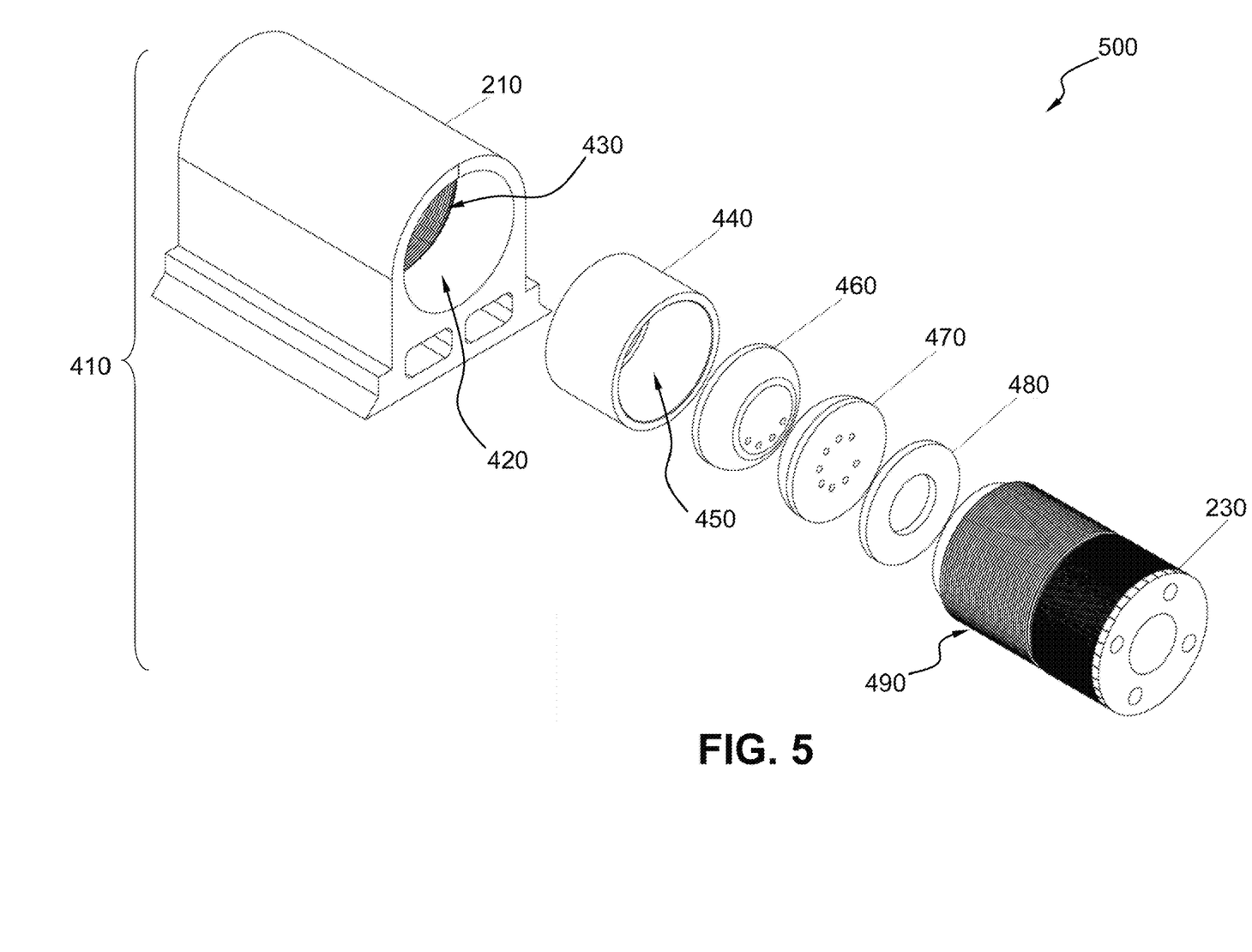
FIG. 5 is an isometric exploded view of the text fixture components.

The coupons 460, 470 are composed of respective test materials. The cup 440 and the washer 480 form the container 160 and are each composed of G-10/FR4 phenolic resin or else high-temperature polyester ether ketone (PEEK) plastic ($C_{19}H_{14}O_3$) as thermally insulating materials. The compressor 230 includes an outer helical threaded portion 490 that can engage the corresponding inner portion 430. The threaded portion 490 extends 3.3 inches in length. FIG. 5 shows an isometric exploded view 500 of the text fixture components 410, including relative position prior to assembly of the test fixture 150.

Figure 6:
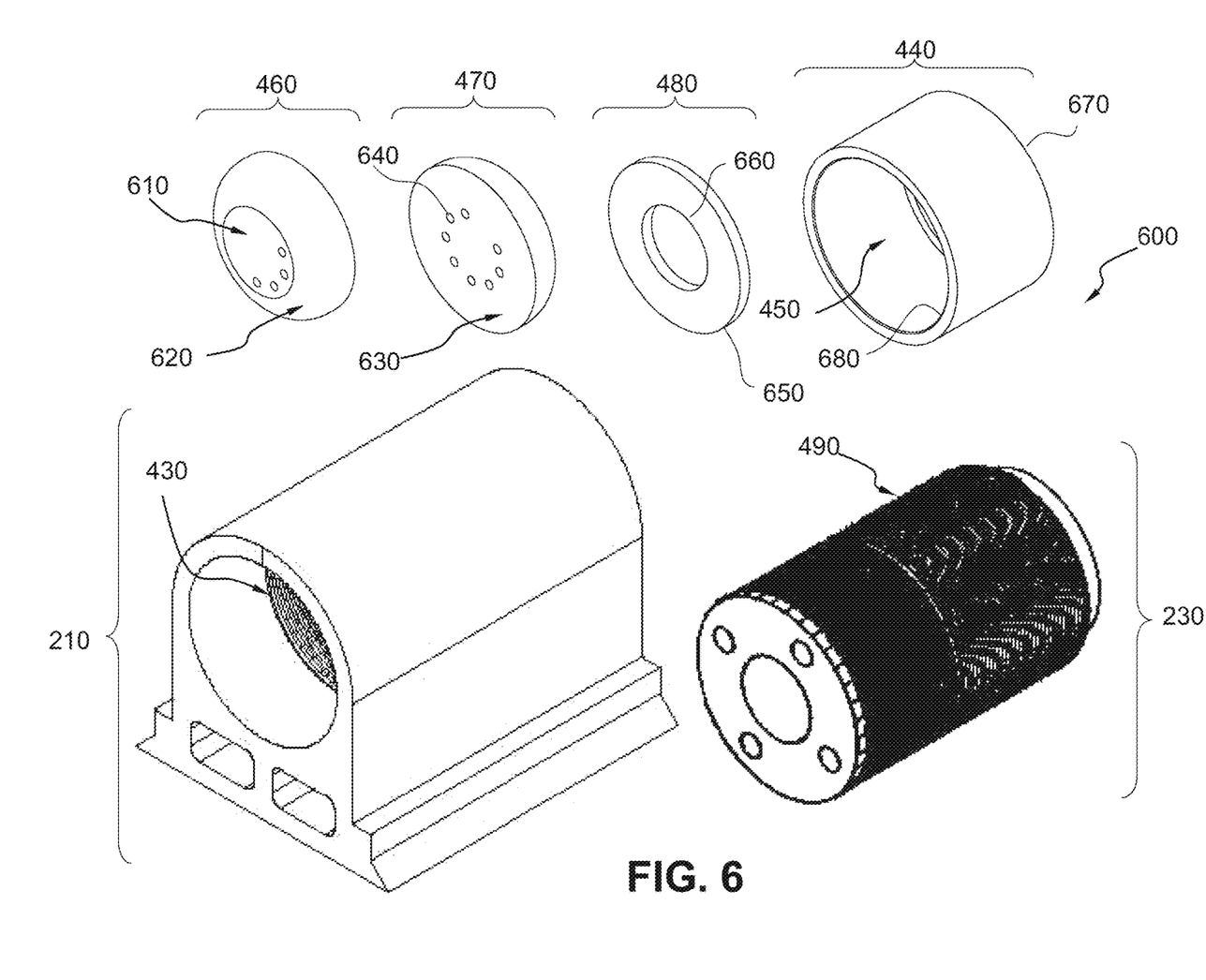
FIG. 6 is a set of isometric views of isolated test fixture components.

FIG. 6 shows a set of isometric views 600 of separate components 410 of the test fixture 150. Both fore and aft coupons 460 and 470 have circular cross-sections. Each coupon 460 and 470 includes an inner flat face 610 with a diameter of 2.0 inches that together at the interface 170 abut thereby forming the sample, a curved semi-oval transition mid-section 620 having a depth of 1.0 inch with a surface radius of 0.75 inch, and an outer flat face 630 with a diameter of 3.5 inches. The faces 610 of the coupons 460 and 470 joined together represent the interface 170.

The laser 130 emits the beam 140 that illuminates the outer face 630 of the fore coupon 460. Several round holes 640 arranged angularly between the faces 610 and 630 axially penetrate into the mid-sections 620, with the fore coupon 460 having four and the aft coupon 470 having eight. The holes 640 have a diameter of 0.20 inch and have varying depths for thermocouple insertion. The washer 480 includes an outer circumference 650 and an inner circumference 660.

The cup 440 includes a lip at the fore end 670 and has an inner circumference 680 for receiving the coupons 460 and 470 that abut against a circular lip at the window 310 followed by the washer 480. Upon insertion of the cup 440 into the opening 420 of the housing 210, the fore end 670 is disposed adjacent to the window 310 and has the same diameter for receiving the beam 140.

In the examples shown, the cup 440 has outer and inner diameters of 4.0 inches and 3.5 inches respectively, and a length of 2.5 inches. The cup 440 contains the coupons 460, 470 and the washer 480 within its volume 450 to form the sample container 160. This assembly inserts into the opening 420 of the housing 210 starting at the fore end 670. The compressor 230 follows to press against the washer 480, turning on its external threaded portion 490 against the internal threaded portion 430 to control the degree of compression to be imposed against the coupons 460 and 470.

Figure 7:
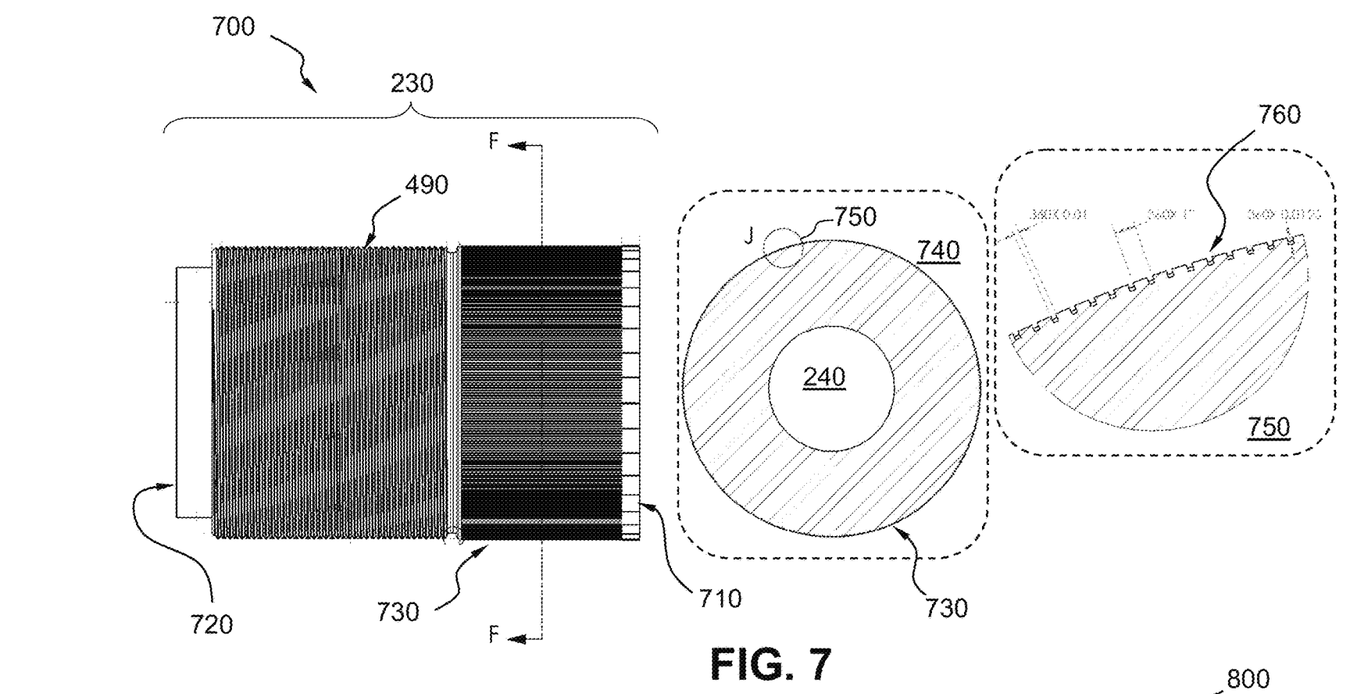
FIG. 7 is set of detail cross-section elevation and cross-section views of an insert.
Figure 8:
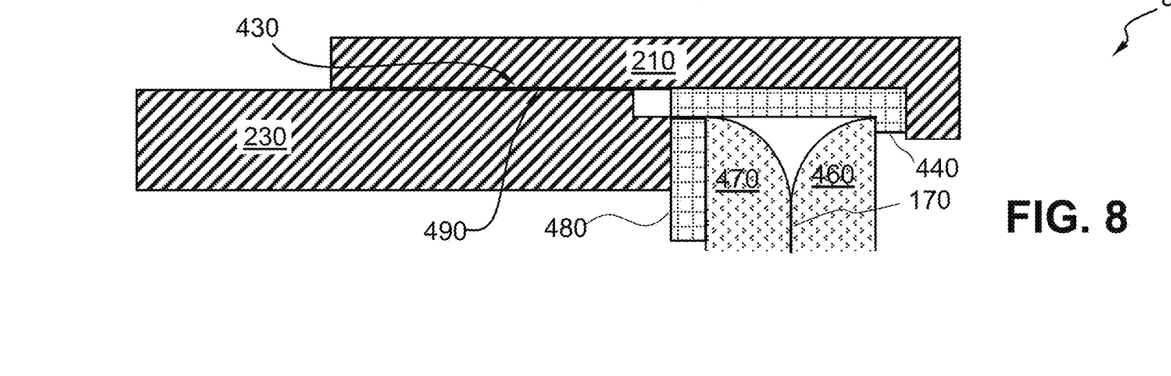
FIG. 8 is an elevation cross-section view of component interfaces.

FIG. 7 shows a set of elevation views 700 of the compressor 230, which includes an external face 710 and an internal face 720 that engages the washer 470. A serrated mid-section 730 provides calibration markers as well as improved frictional gripping to turn the compressor 230. An elevation front view 740 shows the cylindrical volume 240 and provides a surface detail 750 in a detail view of angularly spaced longitudinal notches 760. These regularly distributed serrations enable operators to apply known pressures at 10° or 1° intervals of turn-of-nut of the compressor 230. FIG. 8 shows a detail cross-section elevation view 800 of the coupons 460 and 470 within the cup 440 inside the housing 210 and abutting against the compressor 230.

Figure 9A:
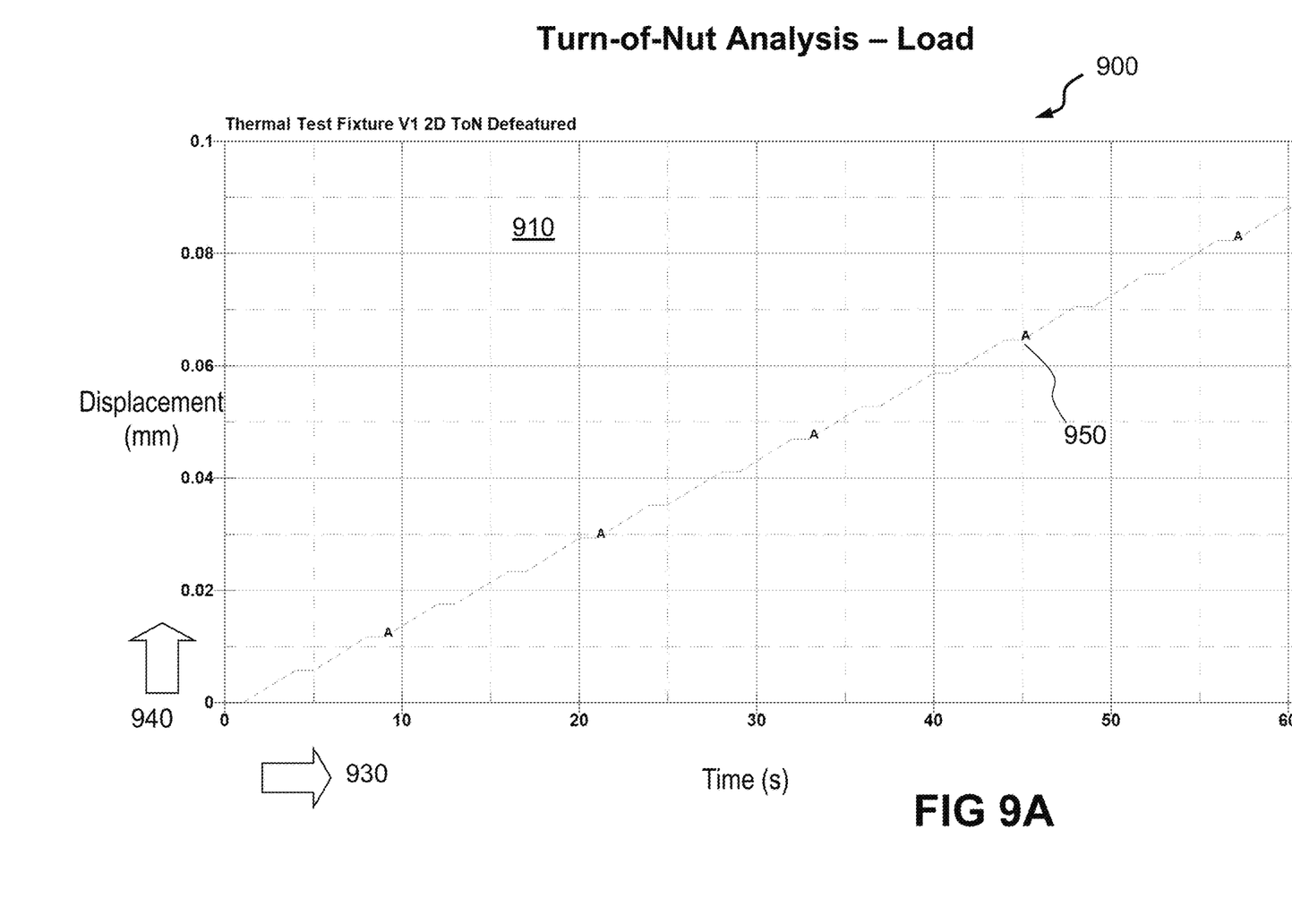
FIG. 9A is a graphical view of a displacement with time.
Figure 9B:
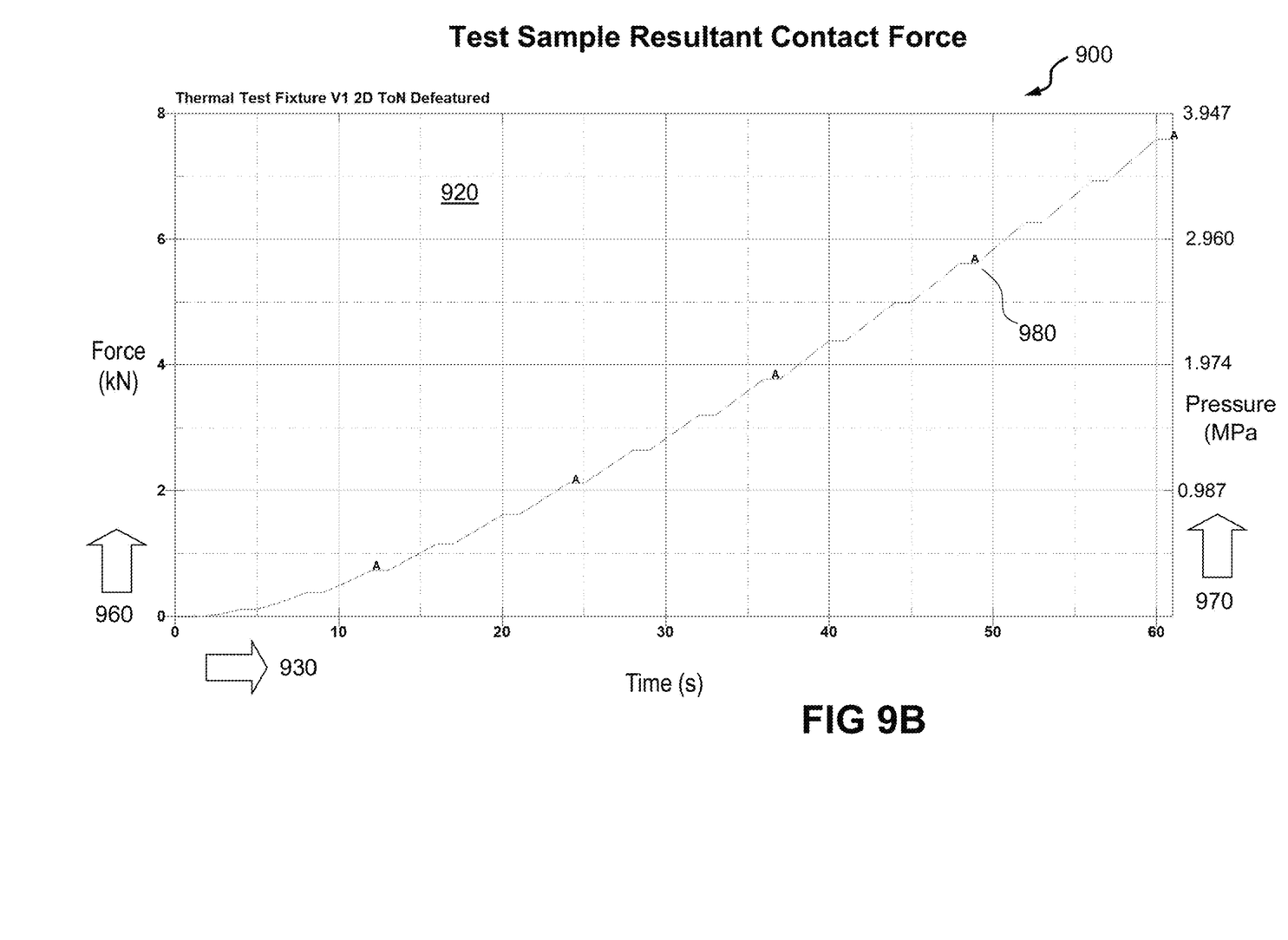
FIG. 9B is a graphical view of a force and pressure with time.

FIGS. 9A and 9B show graphical views 900 of turn-of-nut displacement plot 910 and force-and-pressure plot 920. For the first plot 910, time 930 ($s$) denotes the abscissa, and displacement 940 (mm) constitutes the ordinate. Data points 950 show approximately linear temporal increase in displacement, which results from turn-of-nut intervals applied to the compressor 230.

This displacement results from junction movement of the washer 480 and the compressor face 720 as a mechanism to apply contact pressure at the interface 170 between coupons 460 and 470 in a structural analysis. The curve from points 950 represents the resulting load at that interface 170 and not a result of thermal expansion, but rather a load condition of the structural analysis. For the second plot 920, time 930 ($s$) denotes the abscissa, while force 960 (kN) represents the left ordinate and pressure 970 (MPa) constitutes the right ordinate. Data points 980 show near-linear slightly accelerating increase in these correlated stress measures as time progresses.

Figure 10A:
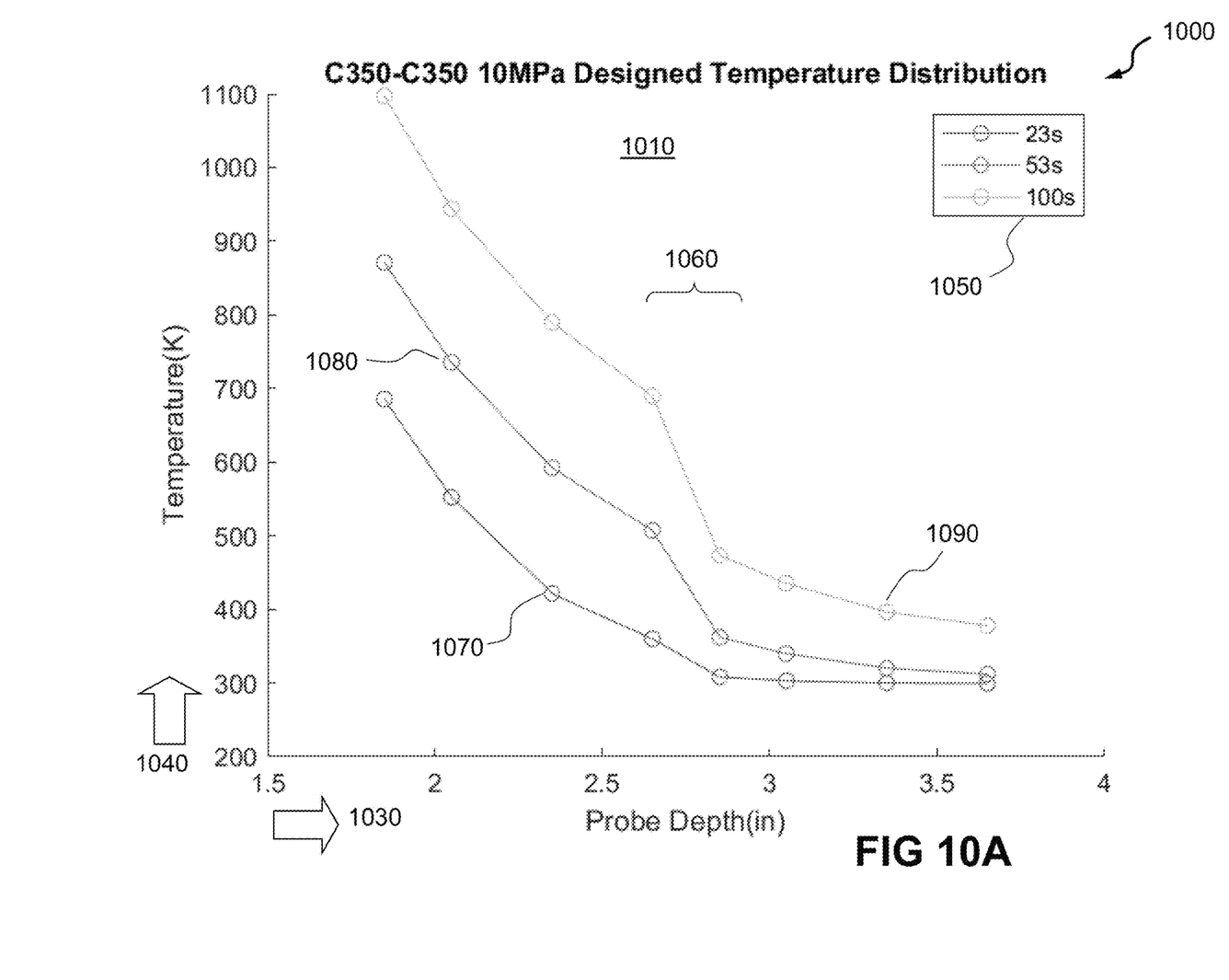
FIG. 10A is a graphical view of thermal response between test coupons of the same material.
Figure 10B:
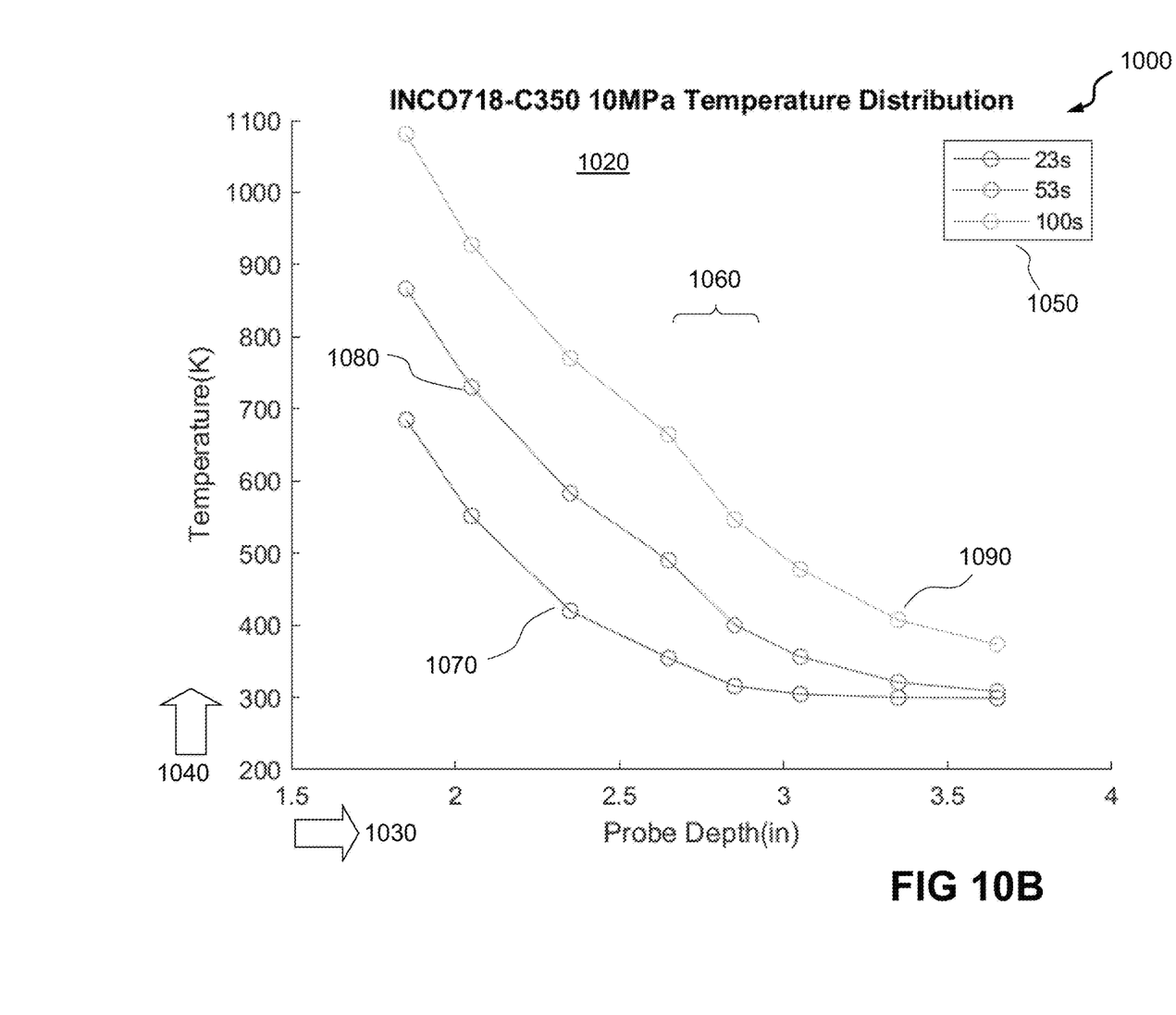
FIG. 10B is a graphical view of a thermal response between test coupons of differing materials.

FIGS. 10A and 10B show graphical views 1000 of first and second sample plots 1010 and 1020 of temperature response distribution, both at pressure of 10 MPa. The first plot 1010 tests fore and aft coupons 460 and 470 as both composed of C350 maraging steel. The second plot 1020 tests fore coupon 460 as Inconel-710 steel, while the aft coupon 470 is composed of C350 maraging steel. Probe depth 1030 (inches) denotes the abscissa, and temperature 1040 (K) denotes the ordinate. These depths 1030 correspond to thermocouple positions in holes 640 within the coupons 460 and 470.

A legend 1050 identifies time intervals of laser beam exposure, and a section 1060 highlights the temperature drop across the coupons 460 and 470 from which TCR can be calculated. The data points 1070 feature thermal response at 23 seconds, points 1080 at 53 seconds and 1090 at 100 seconds. The temperature drop between the fourth and fifth points at the section 1060 in each line for points 1070, 1080 and 1090 is used to calculate the TCR. Measured temperatures range from below 300K (room temperature) to 1100K.

The relations for the TCR is explained as follows. First, the laser's heat flux $q_{laser}$ (W/m$^2$) from the beam 140 is determined by:

$$q_{laser} = -\frac{dT_A}{dx_A}k_A - \frac{dT_B}{dx_B}k_B - dT_c C_{tc}, \quad (1)$$

where $dT_A$, and $dT_B$ represent respective temperature differences (K) across samples A and B, $dx_A$ and $dx_B$ represent respective distances (m) across the thicknesses of samples A and B, $k_A$ and $k_B$ represent respective thermal conductivities (W/mK) of the materials for samples A and B, $dT_c$, denotes temperature difference across the contact (K), and $C_{tc}$ constitutes thermal contact conductance (W/m$^2$K) of the interface 170.

Rearranging terms, thermal contact conductance can be calculated as:

$$C_{tc} = \frac{q_{laser} + \frac{dT_A}{dx_A}k_A + \frac{dT_B}{dx_B}k_B}{dT_c}. \quad (2)$$

Note that the samples A and B correspond in the fixture 150 as coupons 460 and 470. This conductance enables determination of TCR (K/W) denoted as $R_{tc}$ from the conductance's reciprocal:

$$R_{tc} = \frac{1}{C_{tc} \cdot A_c}, \quad (3)$$

where $A_c$ is the contact area (m$^2$) of samples A and B. All parameters are measured or previously established except for the TCR, which is calculated from eqn. (3).

The purpose of the test setup 110 is to acquire temperature gradient data through materials of known properties in contact with each other. The temperature gradients are used to calculate the TCR at the contact of the two materials. The temperature gradients are generated with a laser heat source applied to one external surface of the materials. This heat source is required tp emulate the magnitude and effect of external heating experienced by hypersonic vehicles in flight. Exemplary embodiments can also be used for myriad of secondary purposes, including material testing for laser lethality, material property testing, and composite testing.

Exemplary embodiments provide a test fixture 150 to acquire the TCR between a pair of test samples as coupons 460 and 470 instrumented with thermocouples. The fixture 150 is heated by a laser 130 to apply a heat flux through the samples and generate a temperature gradient. The shape of this gradient response can be used to calculate the TCR between the samples. TCR affects how an external heat flux propagates through the contacting bodies and is primarily dependent on contact pressure and the materials in contact. Exemplary embodiments enable operators to readily swap out test sample materials and modulate the contact pressure.

In order to apply an external heat flux from a laser 130, the samples as coupons 460 and 470 must be clamped by a mechanism within the fixture 150. Clamping is required because the TCR value to be measured depends on the pressure at the contact between the sample pair. The clamping mechanism must apply pressures at the contact known to the operators so thermal contact resistances may be predicted and compared to the test data.

These necessities led to the development of a torqued threaded push pipe or compressor 230 that presses the test samples together from the back of the fixture 150. A lip at the fore end 670 of the cup 440 with an inner diameter that corresponds to that of the laser beam 140 supports the clamping pressure from the front of the fixture 150. This clamping mechanism in combination with an externally applied laser heat flux source is novel for TCR test fixtures. Conventional fixtures used hydraulic presses with imbedded heaters to gather data.

Assembly of the test fixture 150 involves inserting the cup 440 into the opening 420 of the housing 210. The coupons 460 and 470 are inserted into the cup 440, with the washer 480 thereafter. The housing 210 is set in front of the laser 130 and the base 220 is clamped to the table 120. The compressor 230 is then inserted into the opening 420 of the housing 210 with threaded sections 430 and 490 screwed in position. The compressor 230 is torqued the required number of 10° or 1° turn-of-nut intervals to apply a desired contact pressure to the coupons 460 and 480 as test samples in the housing 210.

The test fixture 150 is instrumented with thermocouples in the holes 640. The test fixture 150 is centered where the laser beam 140 can shine. A data acquisition (DAQ) system (not shown) is linked to embedded thermocouples (not shown) installed within their holes 640. The laser 130 is activated and heats the fore coupon 460. The temperature gradient is recorded in the DAQ, and the TCR is extracted using eqns. (1) through (3).

The test fixture 150 is easily assembled and disassembled as described. Parts can be replaced easily for maintenance or in the event of part failure. Maintenance may be required on some parts due to stress fatigue under high cyclic loading. The insulation may need replacement between high clamping pressure tests due to deformation.

Additional testing of any given material pairing should be performed when the samples have cooled to the ambient temperature of the room, and the thermocouples read that same temperature. Contact pressure can be easily adjusted by further torqueing or loosening the push pipe for more test runs.

The attached outlines a configuration of the test fixture 150 and is designed to be used with a laser 130 capable of producing a 100 W/cm$^2$ heat flux uniformly over a 3-inch beam diameter, and the outer diameter of the test samples matches this value. This is best performed by shuttering the edges of a wider beam 140 and centering the coupons 460 and 470 as test samples on the high intensity region of the beam distribution. The test fixture 150 can be scaled up or down depending on the desired laser heat source or secondary testing purpose.

The exemplary design is intentionally fully modular and scalable. The test sample materials may be adapted for the operator's desires. The coupons 460 and 470 as samples can be made of metals, ceramics, plastics, etc. A range of material pairings are present in hypersonic flight bodies, so the test fixture 150 was designed to accept a range of test sample materials. The contact of the test samples may be adapted to adjust the expected TCR or to analyze other material properties. This can be accomplished by changing the surface finish, adding pitting, or changing the contact geometry.

The housing 210 material may also be adapted for the operator's desires or preferences. However, the test sample materials' overall stiffness must be less than the stiffness of the housing 210 to provide clamping forces at the test samples' contacts. The housing 210 would likely function preferably with a strong and stiff metal to provide structural robustness against high clamping loads.

The test fixture 150 may be further adapted by increasing the number of test samples, changing their thickness, and changing the contact geometries. The operator may desire a multiple material stack-up to be tested. This can be handled by shortening the compressor 230 and placing more test samples and instrumentation into the housing 210. The compressor 230 can also be adapted to accept any interface to torque the compressor 230. View 700 assumes a spanner wrench, but the rear end of the compressor 230 can be machined to fit any desired wrench or torque device. The test fixture 150 does not require any specific manufacturing techniques.

Current material assignments and geometry are ideal for testing the TCR in hypersonic projectiles. The possible adaptations outlined in this disclosure can be made for different hypersonic geometries with different requirements. The exemplary test fixture 150 is designed to enable the operator to satisfy their exact requirements for TCR testing or any of the possible secondary material testing uses.

The primary advantage of exemplary embodiments is the heat application technique in concert with the novel clamping design for compressing the test samples. The laser-applied heat flux creates much higher temperatures than those achieved by conventional techniques. These higher temperatures, and the focus of the high temperatures on the surface of one sample, emulate the aerothermodynamic environment hypersonic vehicles interact with in flight. This emulation provides more applicable and accurate data to calculate the TCR of contacting materials in hypersonic vehicles.

The design for clamping the sample materials was required to enable the samples to be heated by an external laser source 130. The design for the compressor 230 is advantageous by enabling an operator to establish the contact pressure without requiring extra equipment. This design is advantageous in cost as it does not require heavy machinery such as a hydraulic press, and laser heating sources are already available. The physical design of exemplary embodiments differs from conventional techniques with the clamping design applied to a TCR test fixture.

The field of TCR testing and theory has historically been focused on the development of micro-electronics or heating/cooling equipment. These applications can make employ conventional techniques. Main contributors to this field have not evaluated TCR in a relevant thermal environment to hypersonics. Primary alternative methods would require different external heating sources to emulate the hypersonic environment and produce the resulting temperature gradients through the sample materials.

An example heating source would be an arc jet where high-temperature ionized plasma flows over the samples, but this would require adaptation of exemplary embodiments to provide protection to the fixture's structural robustness under high heat load. The arc jet is less controllable than the laser 130 as its heat disperses within the flow. The laser 130 can simply be shuttered cutting off any heat flux applied to any component of the fixture 150 other than the test samples as coupons 460 and 470. Adaptations for use in an arc jet would require extra cost in added protective or insulative material.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A test fixture for containing a duo of fore and aft test samples that forms a sample pair by said samples contacting each other along an interface, said fixture receiving exposure to laser emission for radiative heating of said fore test sample while providing compression to said sample pair and comprising:
   a housing having an axial cavity with annular cross-sections including an internal helical thread portion and a window for receiving the laser emission for exposure to the fore test sample;
   an isolation container for receiving the sample pair, said container being inserted into said axial cavity and including an opening for disposition adjacent to said window; and
   a compressor with circular cross-sections for insertion into said axial cavity and including an external helical thread portion for engaging said internal helical thread portion of said housing, wherein axial pressure is applied to said aft test sample of said sample pair by turning said compressor inside said axial cavity.

2. The fixture according to claim 1, wherein said housing includes a base for mounting to a platform.

3. The fixture according to claim 1, wherein said isolation container provides thermal insulation from said housing and said compressor, and comprises a cup with said opening to isolate the sample pair from said housing, and a washer to isolate the sample pair from said compressor.

4. The fixture according to claim 1, wherein said compressor further includes a series of notches for establishing torque from said turning to control said axial pressure.

5. The fixture according to claim 1, wherein said compressor further includes a central conduit.

* * * * *